May 19 1925.

F. BLAKE 1,538,542

BICYCLE AND MOTOR CYCLE SEAT

Filed Feb. 16, 1924

2 Sheets-Sheet 1

INVENTOR
FRED BLAKE
BY Owen H Spencer
ATTORNEY

May 19, 1925.  
F. BLAKE  
1,538,542  
BICYCLE AND MOTOR CYCLE SEAT  
Filed Feb. 16, 1924  
2 Sheets-Sheet 2
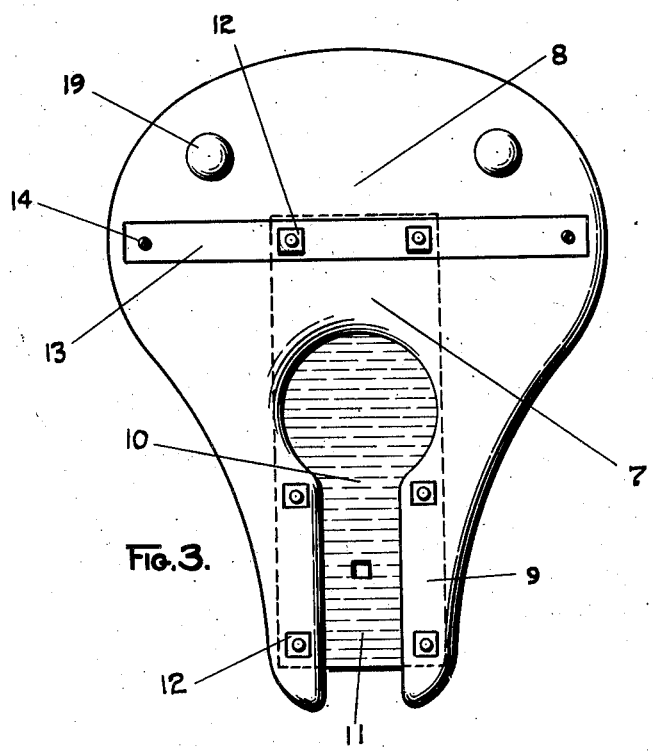
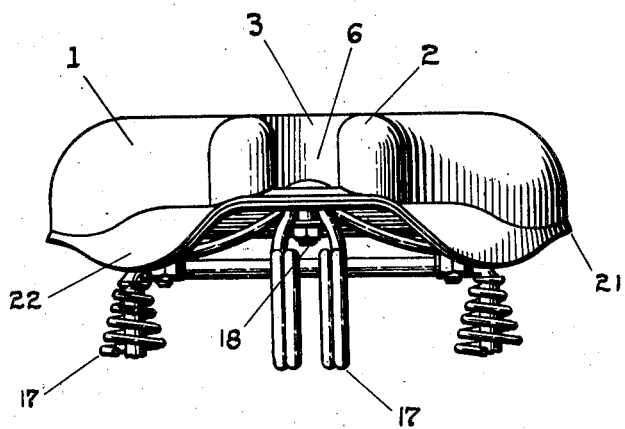
INVENTOR  
FRED BLAKE  
BY Owen H. Spencer  
ATTORNEY Patented May 19, 1925.

1,538,542

UNITED STATES PATENT OFFICE.

FRED BLAKE, OF INDIANAPOLIS, INDIANA.

BICYCLE AND MOTOR-CYCLE SEAT.

Application filed February 16, 1924. Serial No. 693,327.

*To all whom it may concern:*

Be it known that I, FRED BLAKE, a citizen of the United States, residing at Indianapolis, in the county of Marion and State of Indiana, have invented certain new and useful Improvements in Bicycle and Motor-Cycle Seats, of which the following is a specification.

My invention relates mainly to bicycle and motorcycle seats, and more particularly to saddle type seats of this class; and consists substantially in the construction, combination and arrangement of parts hereinafter set forth and pointed out more particularly in the claims.

An object of my invention is to provide a saddle for bicycle or motorcycle use particularly adapted to protect the private organs of the rider whether male or female.

It is a primary object of my invention to provide a bicycle or motorcycle saddle having a suitable cavity properly located to allow comfortable clearance for the private organs of the male rider, said saddle having also a channel adapted to allow clearance for the female rider's private organs, to prevent pressure at the opening of said organs due to the weight of the rider, and tending also to keep said organs in a naturally closed state, the sides of said channel being substantially parallel and bell-mouthed.

It is also an object of my invention to provide a bicycle or motorcycle saddle having a divided forward face constructed on a substantially continuous frame not having a corresponding gap therein, by which arrangement a double horn saddle effect may be carried out without the frame weakness usually incident thereto.

It is a further object of my invention to construct a bicycle and motorcycle saddle having a clearance opening for the private organs of the rider, said opening having a bottom which contains a reenforcing member of said frame for connecting the corresponding supports for the sides of said opening.

Figure 1:
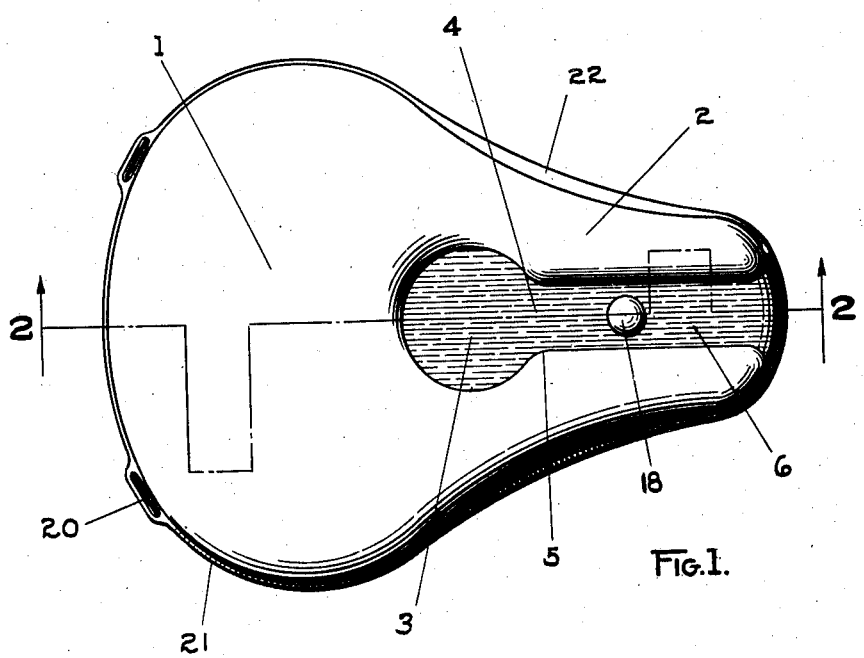
Figure 2:
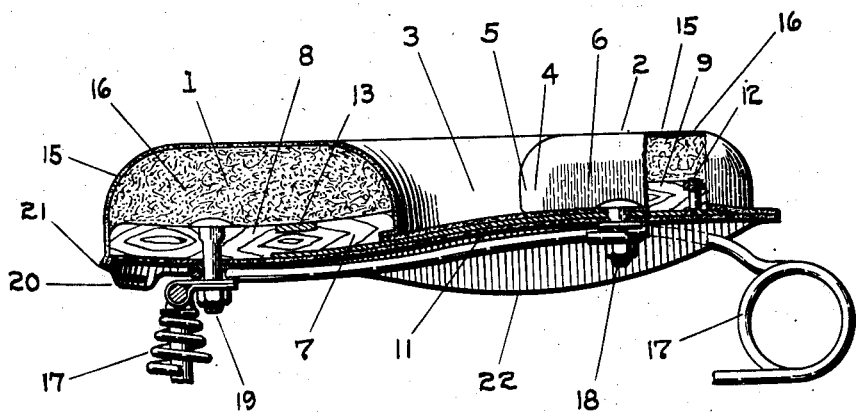

The above and other objects are attained by the structure illustrated in the accompanying drawings, in which Fig. 1 is a plan view of my invention; Fig. 2 is a sectional elevation taken in the proximity of line 2—2 of Fig. 1, also showing fragmentarily the conventional spring mounting which serves to connect my invention to the bicycle or motorcycle (not shown); Fig. 3 is a plan view of the frame structure of my invention with the upholstering and covering removed; and Fig. 4 is a front elevation of Fig. 2.

Similar characters of reference designate similar parts throughout the several views. Referring to Fig. 1, Fig. 2 and Fig. 4, the numeral 1 designates the larger seating portion of my invention, being the rear-ward portion thereof. 2 designates forward extensions formed on said seat portion. Said extensions are dual in character and arrangement and form a somewhat divided horn means of the saddle. Said seat means and said horn means resemble a substantially conventionally shaped bicycle or motorcycle seat in respect to the outer structure. Referring to Fig. 1, a somewhat circular cavity 3 is formed on a medial line of the apparatus as a whole, at the junctions of said extension with said larger seating portion. Said cavity is of suitable size, shape and location to comfortably receive the private organs of a male rider and more particularly the testicle region of such rider. Said opening is of bell-mouthed formation, the bell-mouth character thereof being formed on the upper portion of said opening. Such bell-mouth formation is particularly useful to the comfort of the male rider both during the riding act and also during the mounting or dismounting acts, said organs being slidably lodgeable or dislodgeable in relation to said opening when same is thus covered or uncovered by angular movement as compared to what may be called a vertical straightaway movement.

I have noticed that in the usual riding operation that many riders desire to shift their bodies forward for different reasons, sometimes for more powerful pedaling. This forward shifting movement I have noticed is in many instances carried out by a somewhat horizontal movement forward, the rider not caring to raise himself vertically in connection with such forward movement except to reduce the frictional pressure in the seating surface of said seat, due to the rider's weight. With this and other facts in view, I have provided a medial opening 4 in the forward portion of the cavity 3, so that the male rider may shift forward in relation to said cavity, his private organs being radially dislodgeable therefrom by being slid through said opening which is constructed to form the round corners 5 for the rider's comfort, said opening being thus inwardly flared.

It has come to my attention by somewhat public assertions and statements by medical and physical authorities that the conventional bicycle or motorcycle saddles now in use are especially detrimental to the female riders thereof, due to the prominent contact of the horn means of such saddles in the proximity of the private organs of such riders. The injury resulting from such conditions, I am informed, is due in some instances to the tendency of the conventional saddle horn means to open the private organs of the female rider, and thereby expose the sensitive portions thereof to unnatural pressure and friction; and in some instances to the constant friction and pressure of such horn means against the female rider at sexually sensitive parts, which in many instances causes unnatural sexual excitement, and in some instances, I understand, that all of these conditions result. Being aware of these injurious tendencies, I have provided an upholstered covering on each of the forward extensions 2 symmetrically spaced and cushioned to receive their proportionate part of the female rider's weight at points adjacent to such rider's private organs, such points being conveniently on each side of said organs in respect to the medial line of the invention as shown in Fig. 1. The inner surfaces of said supports together form a somewhat horizontal and bell-mouthed channel 6 the sides of which are symmetrically arranged in relation to a medial line of my invention as a whole in respect to Fig. 1. Said inner surfaces being conveniently parallel in respect to each other, permit any bulging characteristics of the private organs of the female rider to be contained in said channel at any point where said organs should happen to be supported in forward or rear respect to the invention as a whole. I consider the parallel relation of said inner surfaces to be one of the important and useful features of my invention, due to the fact that any irregularity or tapering formation of such channel would tend to bind any bulging parts protruding therein, in case such parts should be slid along longitudinally on said slot, while in my parallel arrangement of said inner surfaces, no irregularity of surface pressure can in this way occur. It is also a useful and beneficial characteristic of my invention, that said inner surfaces are suitably arranged and spaced to more firmly maintain the female rider's organs in their natural closed state.

It is understood that the aforementioned adaptations of my invention for the male and female rider's private organs are carried out in substantially different portions of my invention. This being possible, due to the fact that the thus protected organs of the male rider are carried at a rearward point in relation to the protected organs of the female rider, by which I have been able to carry out distinct and separate formations in the invention as a whole, for the protection of either male or female rider as should chance to use my invention.

My invention is conveniently carried out by a special frame 7 contained therein, said frame serving as a supporting skeleton of my invention. This will be more fully understood by referring to the Fig. 3, which shows the said frame stripped of the upholstering and other parts. It will be observed that said frame is similarly shaped and arranged to the complete finished invention as shown in Fig. 1, the outward structure thereof being of somewhat conventional shape, and the larger seating portion 8 of said frame with the forward extensions 9, being similarly constructed and arranged in accordance with the seating portion 1, and the extensions 2, respectively. The opening 10 shown in Fig. 3 also conforms in shape and arrangement to the opening 4 of Fig. 1. The inwardly disposed sides of the forward extensions 9 are similarly arranged to the same respective surfaces of the extension 2 by which arrangement the peculiar structure of my invention as a whole may be conveniently carried out by conventional upholstering of said frame as will be understood.

With a view of adding strength and rigidity to the frame 7 which is conveniently constructed of wood, I have added a reinforcing plate 11, preferably metal, bolted to the underneath surface of said frame by means of the bolts 12, said plate being suitably adapted and located to connect the forward extensions 9 which thus form with said plates a somewhat continuous and rigid structure, the said plate serving as a bottom means for the cavity 3 and the channel 6 of Fig. 1. A further reinforcement is carried out by a strip 13 preferably metal, disposed across the upper surface of the seating portion 8 of the frame 7, said strip being transversely arranged to a medial line of the invention as a whole. The plate 11 extends rearwardly along on the under surface of said frame, the rearward termination thereof being disposed under the strip 13 in overlapping arrangement therewith by which arrangement the rearward ones of the bolts 12 of the plate 11 may also engage the strip 13 forming a somewhat continuous reinforcing structure with said plate and confining the adjacent portion of the frame 7 between said plate and said strip in a rigid reinforcing manner. Said strip is otherwise secured to said frame by means of the screw means 14.

The exposed surfaces of the saddle structure are formed by conventional upholstering covering 15 perferably leather, upholstering padding 16 being also suitably provided between the upper surfaces of the frame 7 and the respective upholstering covering thereof.

I have shown a conventional supporting spring means 17 to which my invention is conveniently secured by means of the forward bolt 18 and the rearward bolt means 19. By this arrangement the reinforcing plate 11 also serves as a mounting member for my invention said forward bolt serving to indirectly support the forward extensions 9 which are thus supported by said spring means through said plate.

A conventional eye-let means 20 is provided in the skirt portions 21 of the upholstering, said eye-lets being suitable for supporting the usual bicycle or motorcycle tool kits or other articles.

Conventional aprons 22 are provided on the outwardly disposed sides of the forward extensions 2 for protection of the crotch portion of the rider's legs.

As before mentioned, the medial opening 4 is provided in the cavity 3 for the lodgement and dislodgement of certain portions of the male rider under certain conditions as desired. The channel 6 being symmetrically arranged with respect to said opening and having the rearward termination thereof adjacent thereto, I have conveniently constructed said channel to serve as a continuation of said opening, being merged therewith by the round corners 5 which also serve as a bell-mouthed rearward termination of said channel.

While I have illustrated in a general way, certain instrumentalities which may be employed in carrying my invention into effect, it is evident that many modifications may be made in the various details, without departing from the scope of the appending claims, it being understood that my invention is not restricted to the particular form herein described.

I claim as my invention:

1. A bicycle and motorcycle seat comprising a conventionally shaped outer plan formation; a bell-mouthed depression contained in said seat adapted to partly contain the private organs of male riders, and a channel having parallel bell-mouthed sides adapted to partly contain the private organs of female riders, for supporting said organs.

2. A bicycle and motorcycle seat apparatus comprising a saddle frame; opening means contained in said frame for the clearance of the private organs of the riders of said apparatus; a reinforcing member adapted to span said opening means across the lower surface of said frame, and form a bottom for said opening means; a reinforcing strip across the upper surface of said frame to the rear of said openings; and a common bolt means passing thru said strip, frame and member, adapted to confine said frame between said strip and said member in reinforcing manner.

3. A cycle saddle mechanism comprising a conventionally shaped outer structure; a flared depression contained in said structure, adapted to receive the private organs of male riders thereof; an opening leading from said depression for lodgement or dislodgement of said organs by horizontal movement thru said opening; and a channel means forming a continuation of said opening, adapted to receive the private organs of female riders thereof, and permit freedom of horizontal movement of said organs in backward or forward respect to said mechanism as a whole.

4. In combination a cycle saddle mechanism comprising a conventionally shaped outer structure; a flared cavity contained in said structure, adapted to receive the private organs of male riders thereof; an inwardly flaring opening leading from said cavity for lodgement or dislodgement of said organs by horizontal movement of same through said opening; a channel means forming a continuation of said opening, adapted to receive the private organs of female riders thereof, permitting freedom of horizontal movement of said female organs in backward or forward respect to said mechanism as a whole; and a reinforcing plate serving to span said cavity and said channel across the lower surface of said frame, forming a bottom therefor, said plate serving as a mounting means for said mechanism.

5. In combination, a cycle saddle mechanism comprising a conventionally shaped outer structure; a flared cavity contained in said structure, adapted to partly receive the private organs of male riders thereof; an inwardly flaring opening leading from said cavity for lodgement or dislodgement of said organs by horizontal movement of same through said opening; a channel means forming a continuation of said opening, adapted to partly receive the private organs of female riders thereof, permitting freedom of horizontal movement of said female organs in backward or forward respect to said mechanism as a whole; a skeleton frame within said mechanism conforming in shape thereto; a reinforcing plate serving to span said cavity and said channel across the lower surface of said frame, forming a bottom therefor, said plate serving as a mounting means for said mechanism; a reinforcing strip across the upper surface of said frame to the rear of said cavity; and a common bolt means engaging said strip, frame and plate, adapted to confine said frame between said strip and said plate in reinforcing manner.

In testimony whereof, I have hereunto set my hand on this the 13th day of February, 1924, A. D.

FRED BLAKE.

Witnesses:
GEORGE LENNON,
ELLA OGLE.